United States Patent [19]

Kopsco et al.

[11] Patent Number: 4,708,186

[45] Date of Patent: Nov. 24, 1987

[54] SEGMENTED-BAND BANDED TIRE

[75] Inventors: Michael A. Kopsco, Wantagh; Edward G. Markow, Oakdale, both of N.Y.

[73] Assignee: Grumman Aerospace Corporation, Bethpage, N.Y.

[21] Appl. No.: 838,450

[22] Filed: Mar. 11, 1986

Related U.S. Application Data

[63] Continuation of Ser. No. 460,147, Jan. 24, 1983, abandoned.

[51] Int. Cl.⁴ .............................................. B60C 17/00
[52] U.S. Cl. .................... 152/516; 152/158; 152/520; 152/530; 152/532
[58] Field of Search ............... 152/156, 158, 173, 197, 152/198, 205, 207, 516, 520, 530, 532, 536, 538

[56] References Cited

U.S. PATENT DOCUMENTS

| | | | |
|---|---|---|---|
| 840,503 | 1/1907 | Marks | 152/361 R |
| 857,796 | 6/1907 | Ewins | 152/200 |
| 1,259,748 | 3/1918 | Johnston et al. | 152/200 |
| 1,345,777 | 7/1920 | Holdaway | 152/156 |
| 1,374,904 | 4/1921 | Carillon | 152/200 |
| 2,874,742 | 2/1959 | Lugli | 152/361 R |
| 2,895,525 | 7/1959 | Lugli | 152/354 |
| 2,945,525 | 7/1960 | Lugli | 152/361 R |
| 3,667,529 | 6/1972 | Mirtain | 152/361 DM |
| 3,734,157 | 5/1973 | Rogue | 152/158 |
| 4,011,899 | 3/1977 | Chamberlin | 152/359 |
| 4,111,249 | 9/1978 | Markow | 152/361 R |
| 4,318,434 | 3/1982 | Markow | 152/330 RF |
| 4,456,048 | 6/1984 | Markow et al. | 152/361 DM |

FOREIGN PATENT DOCUMENTS

| | | | |
|---|---|---|---|
| 0093451 | 8/1983 | European Pat. Off. | |
| 0101400 | 2/1984 | European Pat. Off. | |
| 583903 | 8/1933 | Fed. Rep. of Germany | 152/352 |
| 1044647 | 11/1958 | Fed. Rep. of Germany | 152/208 |
| 1191702 | 4/1965 | Fed. Rep. of Germany | 152/200 |
| 231822 | 6/1944 | Switzerland | 152/207 |
| 359917 | 4/1930 | United Kingdom | 152/361 R |
| 1035341 | 7/1966 | United Kingdom | 152/156 |

Primary Examiner—Donald E. Czaja
Assistant Examiner—Ramon R. Hoch
Attorney, Agent, or Firm—Pollock, VandeSande & Priddy

[57] ABSTRACT

A banded radial run-flat pneumatic tire with a transversely segmented band that varies the bending stiffness of the band circumferentially relative to the bending stiffness across the band. The band can be segmented into annular side-by-side hoop-like coaxial band elements either of the same or of different diameters. An elastomer bonded between adjoining circumferential edges of the band elements connects them for cooperative association to give the band its desired operating characteristics. The elasticity of the elastomer and the spacing between the band elements can be selected to tailor the performance of the band. Preferably the bending stiffness of the band is 1000 times as great circumferentially as it is transversely across the band.

5 Claims, 2 Drawing Figures

SEGMENTED-BAND BANDED TIRE

This application is a continuation of application Ser. No. 460,147, filed Jan. 24, 1983, now abandoned.

BACKGROUND OF THE INVENTION

1. Field Of The Invention

This invention relates to banded radial run-flat pneumatic tires and, more particularly, to banded tires having a transversely segmented band.

2. Background Of The Invention

The run-flat pneumatic tire is an area of tire technology that has engaged investigators over the years. A run-flat tire is one designed to be able to support a vehicle for operation at reasonable speeds for some predetermined distance even if the tire has partially or totally lost its inflation pressure. A recent successful development in the art of run-flat tires is the band-reinforced radial tire invented by one of the inventors in the present invention, Edward G. Markow, which banded tire is the subject of U.S. Pat. No. 4,111,249, assigned to the assignee of the present invention. The tire of the present invention is in the class of banded tires set forth in the aforementioned patent to Edward G. Markow, which is incorporated herein by reference.

A factor in the design of banded run-flat tires that affects the handling of the vehicle on which the tires are mounted is the bending stiffness of the band across the tire with respect to the bending stiffness circumferentially. Performance of a banded run-flat tire can be improved in a significant manner if the band is constructed such that its bending stiffness in a lateral direction across the band is substantially less than the bending stiffness circumferentially.

2. Description Of The Prior Art

The present invention relates to a banded radial run-flat pneumatic tire having a transversely segmented band. In the prior art, banded radial run-flat tires are disclosed in the Markow patent, U.S. Pat. No. 4,111,249, referenced previously herein. Unlike the transversely segmented bands of the present invention, that Markow patent teaches a solid unsegmented band having a width substantially spanning the width of the crown of the tire.

In the prior art, also, Arthur H. Marks, in U.S. Pat. No. 840,503, teaches a run-flat tire having one or more flat, comparatively heavy metal rings, preferably of steel, embedded in the tire crown. In Marks, however, the object is to produce a tire that has a practically rigid tread such that there is little or no flattening of the tire at the point of contact with the ground. A rigid tire thus is not a run-flat tire of a class in which a comparatively thin band is employed in the crown of the tire, the resilient thin band being supported and stabilized by a multiplicity of radial spoke-like elements in the sidewalls of the tire. Further, there is nothing disclosed in Marks that teaches a segmented band having a bending stiffness circumferentially that is considerably greater than the bending stiffness laterally across the tire. Because of the mentioned considerations, the tire of Marks would be totally unacceptable for present day use because of ride, handling, and service life deficiences inherent in a tire provided with a heavy, rigid metal band in its crown.

SUMMARY OF THE INVENTION

This invention is a banded radial run-flat pneumatic tire having a transversely segmented band. The operating performance of a banded run-flat tire is improved if the band is designed so that its bending stiffness in the circumferential direction is in the order of approximately 1000 times as great as its bending stiffness transversely across the width of the band. The band can be segmented into annular side-by-side hoop-like coaxial band elements either of the same or of different diameters. An elastomer bonded between adjoining circumferential edges of the band elements connects them for cooperative association in operation. The elasticity of the elastomer and the spacing between the band elements are selected to give the band its desired operating characteristics.

It is thus a principal object of the invention to provide a banded run-flat radial pneumatic tire having a segmented band such that the control, handling, and service life characteristics of the tire are significantly improved.

It is a further object of the invention to provide a banded run-flat radial tire in which lateral bending stresses induced by road surface anomalies such as bumps, holes, rocks, and the like, are reduced and band fatigue life is significantly enhanced.

Yet another object of the invention is to provide a banded run-flat radial tire having a segmented band such that a multi-step failure sequence is provided for safety.

A still further object of the invention is to provide a banded run-flat radial tire having a segmented band in which it is possible by using segments of different diameters to accommodate for tread curvature without the requirement for the crowning of individual band segments or elements.

A yet further object of the invention is to provide a banded run-flat radial tire having a segmented band whose design is compatible with conventional tire making processes and equipment and with conventional servicing and maintenance equipment and procedures.

Other objects and advantages will become apparent from a reading of the Specification and a study of the accompanying drawings.

DESCRIPTION OF THE DRAWINGS

For the purpose of illustrating the invention, there is shown in the drawings the forms which are presently preferred; however, it should be understood that the invention is not necessarily limited to the precise arrangements and instrumentalities here shown.

DESCRIPTION OF THE PREFERRED EMBODIMENTS

Figure 1:
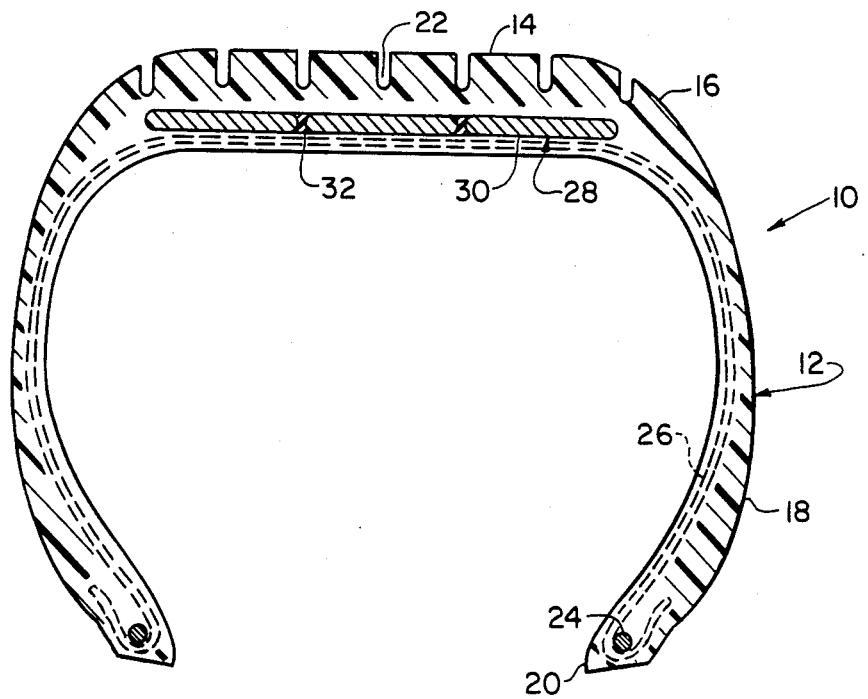
FIG. 1 is a cross-sectional view of an embodiment of the tire of the invention.

Having more particular reference to the drawings, FIG. 1 illustrates an embodiment of the tired 10 of the invention. Tire 10 comprises a carcass or casing 12 having an outer peripheral tread portion 14 in the crown 16 of the casing and sidewalls 18 extending from either side of the crown to beads 20 in the radially inside peripheral regions of the sidewalls. Treads 22 in any desired pattern can be incised in the tread portion 14 of the tire casing. Beads 20, which can be reinforced with the usual annular cords or wires 24, are adapted to seat in the usual manner in an airtight relationship in the rim of a wheel (not shown) upon which the tire will be mounted for operation. The sidewalls 18 of the casing are reinforced by the usual known weftless radial plies or elements 26 of radial tires. Radial elements 26 can be fabricated out of steel wires or suitable textile fibers as is well known in the art. Located in the crown of the radial tire just described underlying the tread thereof is an annular compression element or band 28. Band 28 is reinforced and stabilized by the radial elements 26 in the sidewalls 18 to give tire 10 its run-flat capabilities.

As stated previously herein, the performance of a banded run-flat radial tire is improved if the band is designed such that its bending stiffness in the hoopwise circumferential direction is significantly, up to a 1000 times, as great as its bending stiffness in the lateral direction across the width of the band. Bending stiffness herein is defined as the product of the bending modulus of elasticity E and section moment of inertia I. The latter quantity is arbitrarily derived as will be described in further detail herein.

In this invention, the desired bending stiffness ratio of the band transverse its width with respect to the hoopwise direction is obtained by transversely segmenting the band 28. Thus, the band has a number, preferably three, side-by-side band elements 30 connected by an elastomer 32. To achieve the desired 1000:1 EI ratio, the spacing between the band elements 30 is tailored in direct proportion to the stiffness of the elastomer 32. In a typical design of a tire provided with a segmented band in accordance with the teachings of the invention, using a FR 70-14 radial tire with a three-segment fiberglas/epoxy band and a tire rubber elastomer 32, the hoopwise EI was 20,837 lb-in$^2$ and the equivalent lateral EI was approximately 20 lb-in$^2$.

In the design of the band, hoopwise bending stiffness is expressed by multiplying the bending modulus of elasticity E of the composite from which the band is made by the total section of inertia I of all the band elements or segments, ignoring the bending stiffness of the elastomer. For an existing band, the E of its composite material can be determined by a three-point bending test on a laboratory specimen cut from the band. It will be appreciated that this specimen will be standard except for its curvature. Lateral bending stiffness, for the purposes of this design, is an arbitrarily derived EI product for a uniform beam whose maximum bending deflection is equivalent to that of an actual non-uniform composite/elastomer beam consisting of a unit-width slice across the band. For an existing band, such a slice can be tested by simply supporting it at its ends and measuring its maximum deflection under load. To avoid concentrated loads on the elastomer, the test specimen should be loaded uniformly. From the known loading, deflection, and beam length, a uniform beam EI can be calculated by the standard formula:

$$EI=(5wL^4)/(384\delta)$$

where
w = load per inch
L = length between support
$\delta$ = deflection at center For a proposed design where no sample exists, a unit-width lateral slice can be described as a beam of non-uniform section, assigning handbook values of E to the primary material and the elastomer of the band respectively. Using the more complex handbook formula for a non-uniform beam with a uniformly distributed load, the maximum deflection can be calculated. This will then allow the equivalent uniform beam EI to be calculated as set forth above.

Figure 2:
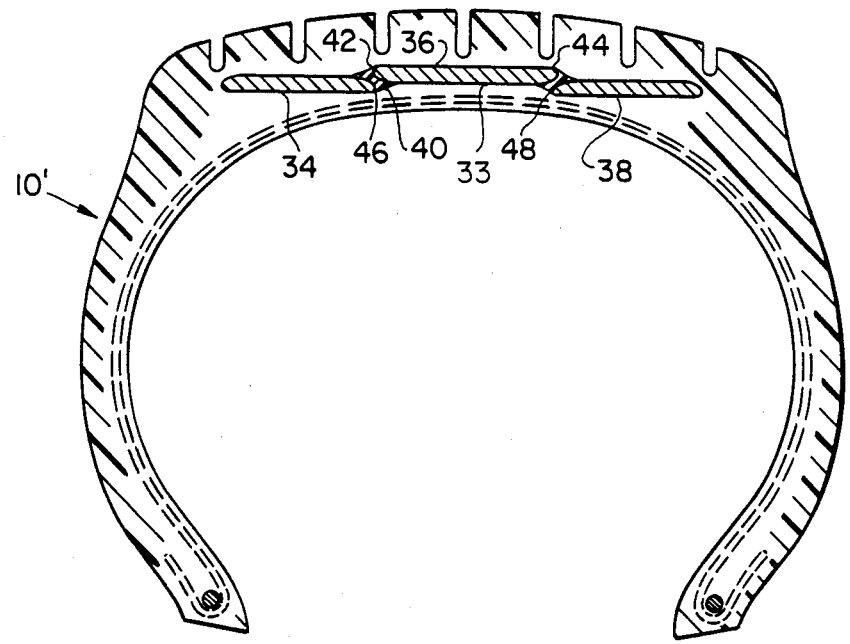
FIG. 2 is a cross-sectional view of a further embodiment of the tire of the invention.

In the FIG. 1 embodiment 10 of the tire of the invention a segmented band 28 having side-by-side band elements of equal diameter is used. In the further embodiment illustrated in FIG. 2, the tire 10$^1$ has a band 33 that is segmented into band elements 34, 36, and 38, with the intermediate band element 36 having a greater diameter than the band elements 34 and 38 on either side of it. A segmenting of the band into three band elements is preferred but, of course, the band can be segmented into a different number of segments to meet specific requirements. To substantially eliminate the possibility that a puncturing object will penetrate the band 32 through the elastomer 40 connecting the band elements, the adjoining edges of those elements can be overlapped. Thus, circumferential edges 42 and 44 of band element 36 can overlap circumferential edges 46 and 48 of band elements 34 and 38 respectively. As shown, the radially inside surface of band element 36 at edges 42 and 44 is bevelled to match bevels on the radially outside surfaces of band elements 34 and 38 at their edges 46 and 48. With the exception that the elements of the band are not of equal diameters, tire 10' is substantially identical to the tire 10 embodiment of the invention illustrated in FIG. 1. The two embodiments have the same casing, sidewalls, tread portion, radial elements, and the like. In the interests of brevity, a detailed description thereof thus will not be given.

Although shown and described in what are believed to be the most practical and preferred embodiments, it is apparent that departure from the specific methods and designs described and shown will suggest themselves to those skilled in the art and may be made without departing from the spirit and scope of the invention. We, therefore, do not wish to restrict ourselves to the particular constructions described and illustrated, but desire to avail ourselves of all modifications that may fall within the scope of the appended claims.

Having thus described our invention, what is claimed is:

1. A run-flat radial tire comprising:
   a casing having a treaded crown portion and sidewalls terminating radially inwardly to generally circular beads adapted to normally seat themselves in airtight secured relationship with a wheel;
   a plurality of resilient coaxially spaced band segment means embedded within the crown portion for resisting compressive load forces exerted thereon when the tire is deflated;
   a plurality of radial means embedded within the casing for transmitting compressive load forces to the band means when the tire is deflated; and
   elastomeric material located between individual segments of the band means for transferring the compressive forces to all band means and ensuring a preselected ratio of tire bending stiffness in the circumferential direction compared with the lateral direction thereby improving tire performance when deflated.

2. The structure set forth in claim 1 wherein the individual segments have identical diameters.

3. The structure set forth in claim 1 wherein the band means comprises:
   at least one centrally disposed band segment; and a plurality of band segments positioned laterally outwardly from the central band segment and reduced in diameter for following the tire tread contour.

4. The structure set forth in claim 3 wherein confronting edges of the band segments overlap for increasing puncture resistance of the tire.

5. The structure set forth in claim 4 wherein the confronting edges are beveled to retain an equidistant relationship between the confronting edges.

* * * * *

UNITED STATES PATENT AND TRADEMARK OFFICE
CERTIFICATE OF CORRECTION

PATENT NO. : 4,708,186

DATED : November 24, 1987

INVENTOR(S) : Edward G. Markow, et al.

It is certified that error appears in the above-identified patent and that said Letters Patent is hereby corrected as shown below:

```
Column 1, line 66, change "deficiences" to --deficiencies--.

Column 2, line 61, change "tired" to --tire--.

Column 3, line 16, delete "a".

Column 3, line 23, change "glas/epoxy" to --glass/epoxy--.

Column 4, line 8, change "10¹" to --10'--.
```

Signed and Sealed this

Fourth Day of October, 1988

Attest:

DONALD J. QUIGG

Attesting Officer

Commissioner of Patents and Trademarks